(12) United States Patent
Barakat

(10) Patent No.: US 9,061,230 B2
(45) Date of Patent: Jun. 23, 2015

(54) SYSTEM TO REMOVE CONTAMINANTS FROM AIR STREAM

(71) Applicant: Yaser K. Barakat, Roanoke, VA (US)

(72) Inventor: Yaser K. Barakat, Roanoke, VA (US)

(*) Notice: Subject to any disclaimer, the term of this patent is extended or adjusted under 35 U.S.C. 154(b) by 0 days.

(21) Appl. No.: 14/061,629

(22) Filed: Oct. 23, 2013

(65) Prior Publication Data
US 2014/0109766 A1 Apr. 24, 2014

Related U.S. Application Data

(60) Provisional application No. 61/718,021, filed on Oct. 24, 2012.

(51) Int. Cl.
*B01D 47/02* (2006.01)
*B01D 53/18* (2006.01)

(52) U.S. Cl.
CPC .............. *B01D 47/025* (2013.01); *B01D 53/18* (2013.01); *B01D 2252/103* (2013.01); *B01D 2258/06* (2013.01); *B01D 2247/04* (2013.01); *B01D 2247/12* (2013.01)

(58) Field of Classification Search
None
See application file for complete search history.

(56) References Cited

U.S. PATENT DOCUMENTS

| 2,664,966 A * | 1/1954 | Moore ............................. 55/451 |
| 2,833,417 A * | 5/1958 | Steenhagen et al. .......... 210/330 |
| 3,141,750 A * | 7/1964 | Hungate ......................... 55/407 |
| 3,443,364 A * | 5/1969 | Saltsman ........................ 96/313 |
| 4,016,102 A | 4/1977 | Marion |
| 5,704,954 A * | 1/1998 | Takagi ............................ 96/286 |
| 6,382,221 B2 * | 5/2002 | Saitoh .......................... 134/25.5 |
| 8,914,941 B2 * | 12/2014 | Kim et al. ....................... 15/353 |
| 2005/0076782 A1 * | 4/2005 | Weinbren ........................ 96/306 |
| 2006/0075728 A1 * | 4/2006 | Oh et al. ......................... 55/345 |
| 2007/0261828 A1 * | 11/2007 | Chang ........................... 165/162 |
| 2009/0169452 A1 * | 7/2009 | Constantz et al. ............. 423/230 |
| 2011/0000437 A1 * | 1/2011 | Meter ............................ 119/311 |
| 2011/0136214 A1 * | 6/2011 | Cheung ....................... 435/283.1 |
| 2011/0139005 A1 * | 6/2011 | Kwon ............................. 95/216 |
| 2012/0049114 A1 | 3/2012 | Seeker et al. |
| 2013/0025462 A1 * | 1/2013 | Yun ................................ 96/256 |
| 2014/0182453 A1 * | 7/2014 | Yun ................................ 95/216 |

FOREIGN PATENT DOCUMENTS

JP 11-9945 1/1999

* cited by examiner

*Primary Examiner* — Duane Smith
*Assistant Examiner* — Adam W Bergfelder
(74) *Attorney, Agent, or Firm* — Richard C Litman

(57) ABSTRACT

The system to remove contaminants from an air stream provides an apparatus and method for removing pollutants, especially carbon, from polluted air. The apparatus and method include a device for thoroughly mixing polluted air with water in a manner to cause the carbon to disassociate from the air and be suspended in the water. The cleansed air is re-circulated for reuse. In one embodiment, clay or sand is utilized to absorb the carbon from the water. As contemplated, the carbon-enriched clay or sand may be used for land reclamation.

4 Claims, 4 Drawing Sheets

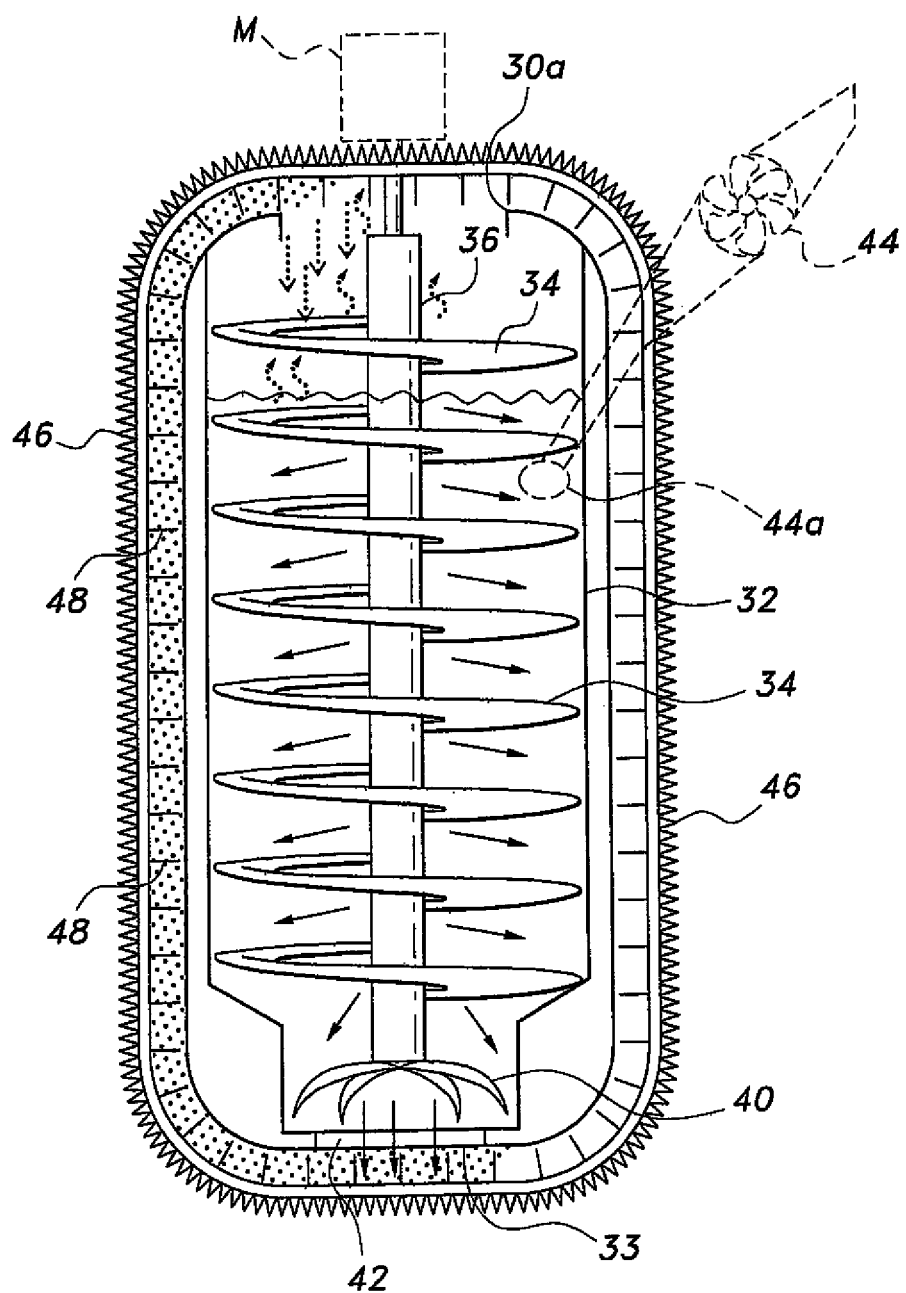
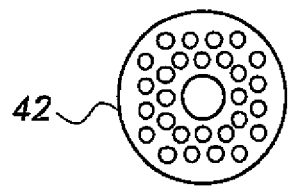
Fig. 2
Fig. 2A

SYSTEM TO REMOVE CONTAMINANTS FROM AIR STREAM

CROSS-REFERENCE TO RELATED APPLICATION

This application claims the benefit of U.S. Provisional patent application Ser. No. 61/718,021, filed Oct. 24, 2012.

BACKGROUND OF THE INVENTION

1. Field of the Invention

The present invention generally relates to a pollution control method and apparatus, and particularly for removing pollutants and/or contaminants from an air stream.

2. Description of the Related Art

Indoor and urban air quality has been cited by experts as among the world's worst pollution problems. Any substance in ambient air that has the potential to cause harm to humans and the environment is classified as an air pollutant. Air pollutants can be in the form of solid particles, liquid droplets, or gases. In addition, they may be natural or man-made, such as the pollution caused by the burning of fossil fuels in home environments and industrial processes, or the burning of gasoline in automotive use. Some of the major pollutants in air are carbon, sulfur particles and oxides of carbon, sulfur and nitrogen.

Oxides of sulfur ($SO_x$), especially sulfur dioxide ($SO_2$), are chemical compounds usually produced in various industrial processes. Since coal and petroleum often contain sulfur compounds, their combustion generates sulfur dioxide.

Nitrogen oxides ($NO_x$), especially nitrogen dioxide ($NO_2$), are emitted during high temperature combustion, and are also produced naturally during thunderstorms by electrical discharge. Both $SO_2$ and $NO_2$ are irritants and have biting odors.

Carbon monoxide (CO) is a colorless, odorless, non-irritating, but a very poisonous gas. It is a product of incomplete combustion of fuels, such as natural gas, coal or wood. Vehicular exhaust is a major source of carbon monoxide.

There are many devices in the related art that have been utilized to rid air of the above-cited impurities and odors. Unfortunately, most of the related art devices are either inefficient or complex, requiring relatively costly financial operational expenditures. The art would certainly welcome an air-cleaning device that is relatively inexpensive and easy to construct and to operate. Thus, a system to remove contaminants from air stream is desired.

SUMMARY OF THE INVENTION

The system to remove contaminants from air stream is drawn to an apparatus and method for removing pollutants, especially carbon, from polluted air. The apparatus and method comprise means for thoroughly mixing polluted air with water in a manner to cause the carbon (and other pollutants) to disassociate from the air and be suspended in the water. The cleansed air is re-circulated for reuse. In at least one embodiment of the invention, clay or sand is utilized to absorb the carbon from the water. As contemplated, the carbon-enriched clay or sand may be used for land reclamation.

Accordingly, the invention presents apparatus for removing pollutants from air that utilizes water as the removing agent. The apparatus is inexpensive and easy to operate.

These and other features of the present invention will become apparent upon further review of the following specification and drawings.

BRIEF DESCRIPTION OF THE DRAWINGS

FIG. 2 is a diagrammatic front view in section of a second embodiment of a system to remove contaminants from an air stream according to the present invention.

FIG. 2A is a top view of a perforated plate covering the outlet at the bottom of the housing of the system of FIG. 2.

Similar reference characters denote corresponding features consistently throughout the attached drawings.

DETAILED DESCRIPTION OF THE PREFERRED EMBODIMENTS

Figure 1:
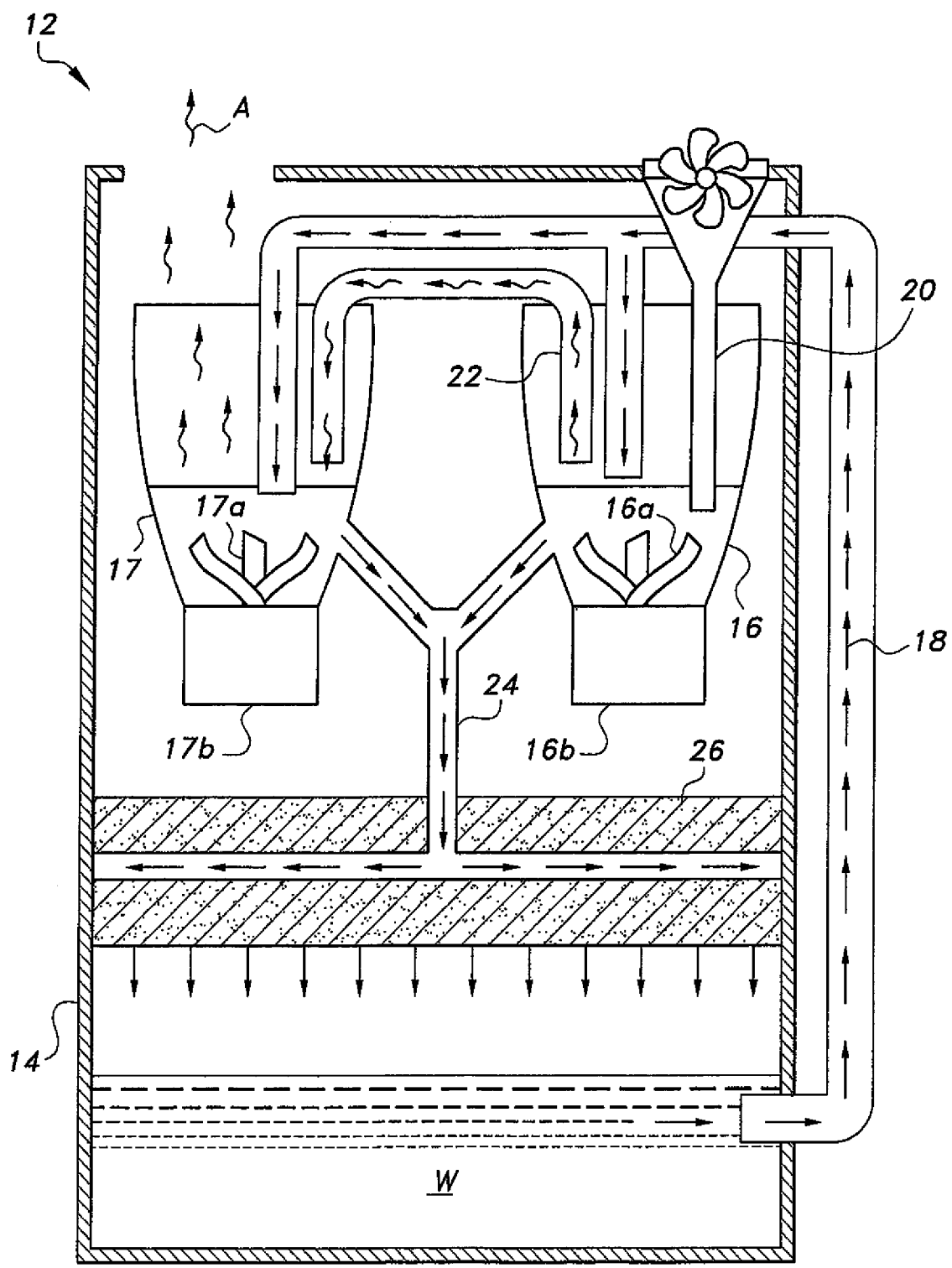
FIG. 1 is a diagrammatic front view in section of a first embodiment of a system to remove contaminants from an air stream according to the present invention.

A first embodiment of a system to remove contaminants from an air stream, as represented in FIG. 1, comprises a housing 12 having a basin 14 for containing water W therein at the bottom of the housing 12. A pair of cyclonic mixers 16, 17 are positioned adjacent the top of the housing 12. Each mixer 16, 17 is provided with a respective mixing blade 16a, 17a, which are driven by respective motors 16b, 17b. A duct 18 transfers water W from the basin 14 to each of the mixers 16, 17. A second duct 20 communicates with the mixer 16 and supplies air that is polluted with carbon and other pollutants into the mixer 16, whereby the polluted air is mixed with water. A third duct 22 transfers a portion of the polluted air-water mixture from mixer 16 to mixer 17. Mixing blades 16a, 17a create a violent turbulence in the mixers 16, 17 to separate the carbon and other pollutants from the air. The clean air A exits the housing 12 for reuse. The water and pollutant mixture exits the mixers 16, 17 via exit duct 24 and flows through a filtering medium 26. The pollutants are absorbed by the filtering medium 26, and the water is returned to the basin 14. Preferably, the filtering medium 26 is sand or clay. The carbon-filled sand or clay may be utilized to reclaim land.

Figure 2B:
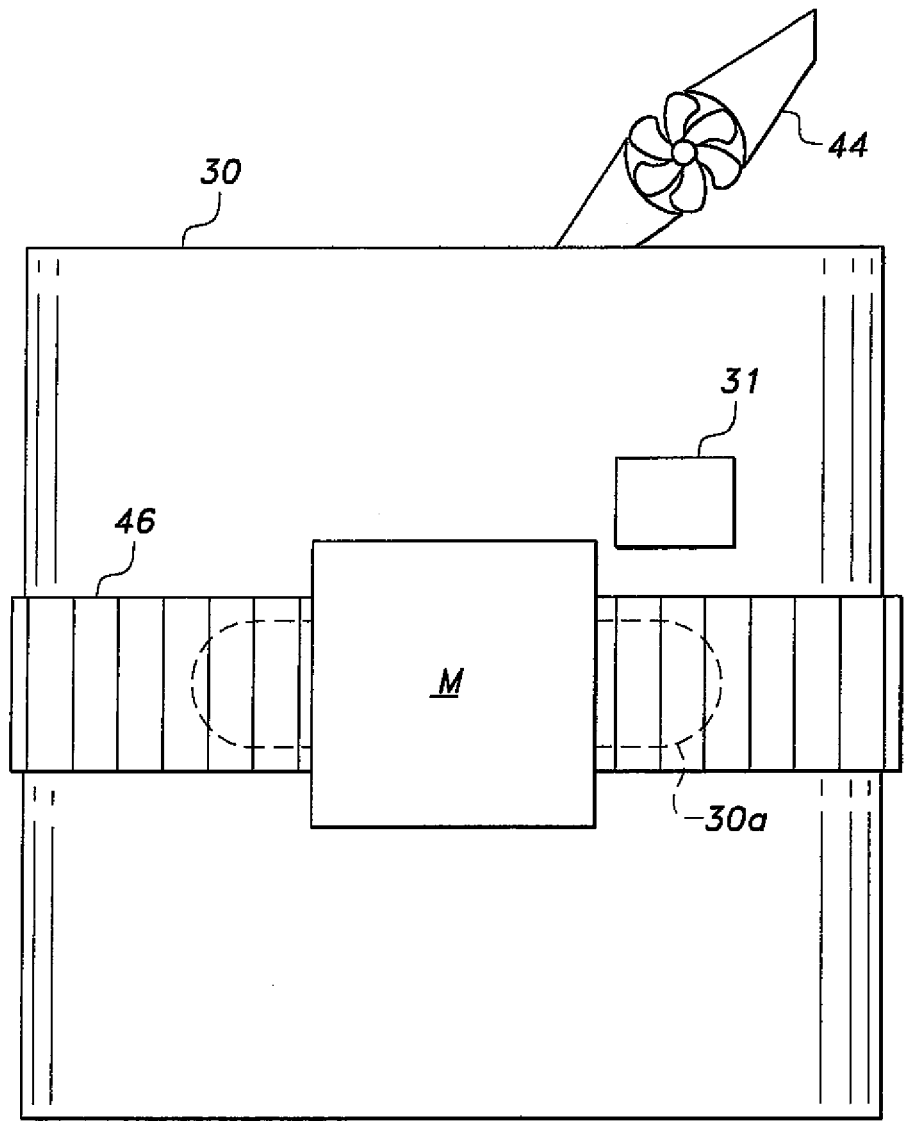
FIG. 2B is a top view of the system of FIG. 2.

The second embodiment of the system to remove contaminants from an air stream, shown in FIGS. 2, 2A and 2B, comprises a housing 30 having an opening 31 at its top and an exit port 33 at its lower end. A cylindrical casing 32 having an entry port 30a is centrally positioned in the housing 30 and encloses therein a plurality of curved or helical turbine-like blades 34 spaced along and attached to a rotating shaft 36. A motor gear arrangement M (shown in phantom lines) is connected to one end of the shaft 36 and functions to turn the shaft 36 and attached blades 34 at relatively high speeds. A grinding blade 40 is attached to the other end of the shaft 36. A perforated plate 42 is positioned to cover the exit port 33. A duct 44 has a delivery end 44a opening into the casing 32. The duct 44 supplies carbon-polluted air into the casing 32. A movable re-circulation belt 46 is positioned to circumscribe the housing 30 for re-circulating a water clay/sand mixture. The movable re-circulation belt 46 includes a plurality of receptacles 48 attached to the inner surface of the belt 46. The belt 46 is driven by the motor gear arrangement M.

In use, water and sand or water and clay are supplied to the casing 32 via the opening 31 and the entry port 30a. The carbon-polluted air is introduced via the duct opening 44a. The spinning blades 34 cause the polluted air to violently mix with the water and clay/sand. The carbon pollutants are absorbed in the clay/sand. The grinding blade 40 pulverizes the carbon-laden clay/sand for flow through the perforated plate 42 and the exit port 33. A portion of the water and clay/sand mixture is collected by the receptacles 48 for re-introduction into the casing 32. Clean air is extracted through the opening 31.

Figure 3:
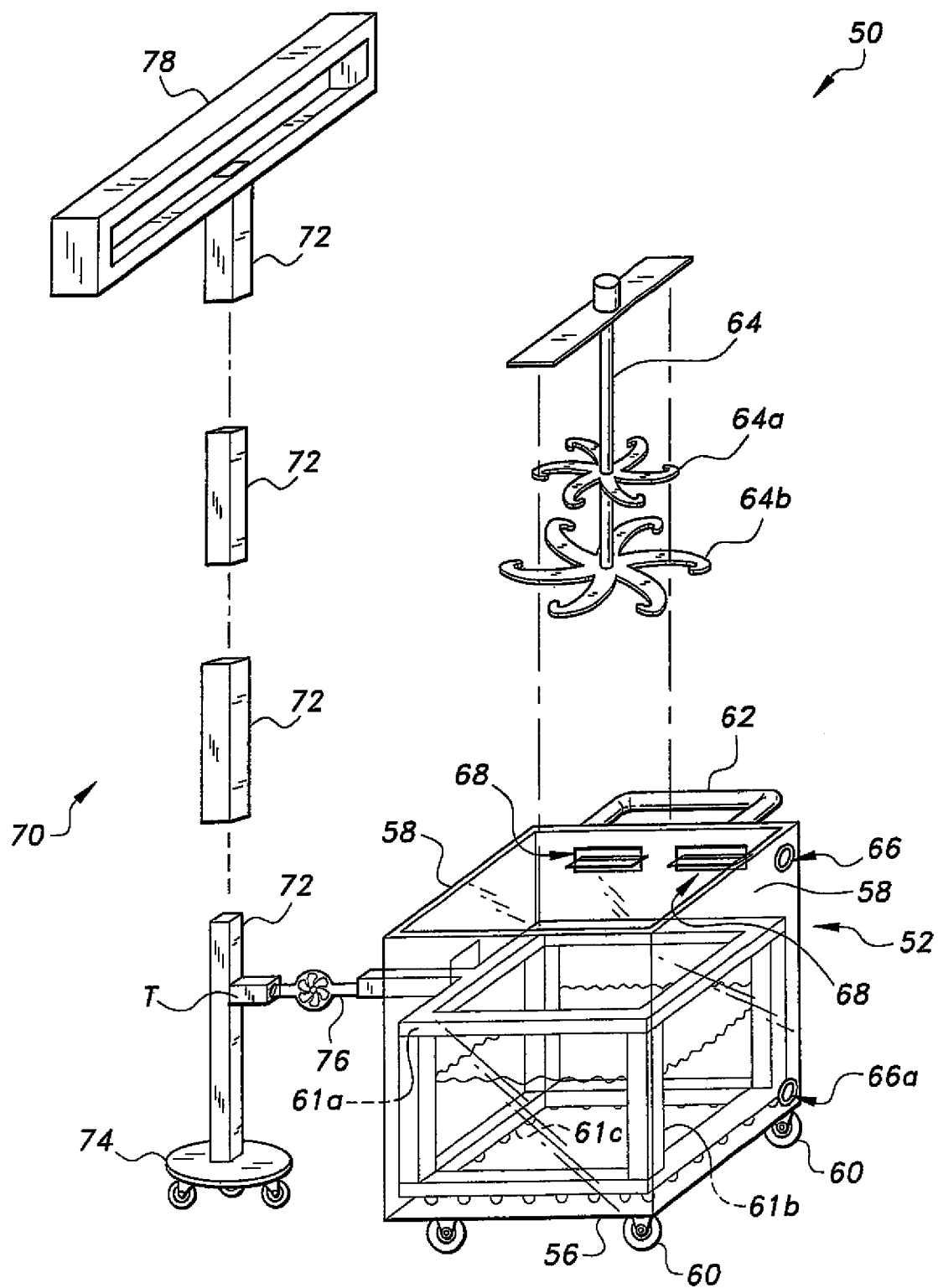
FIG. 3 is an exploded, perspective view a third embodiment of a system to remove contaminants from an air stream according to the present invention.

FIG. 3 illustrates another embodiment of the system to remove contaminants from an air stream, generally indicated at 50, that requires only water to remove the pollutants from the air. In this embodiment, the system 50 is portable and can be used in a home or office setting. The system 50 comprises a housing 52 having a closed top, a closed bottom 56, and sidewalls 58. To enhance portability, wheels 60 are mounted on the bottom wall 56 and a handle 62 is attached to one of the side walls 58. A plurality of tubes 61a, 61b, 61c form a conduit that is positioned in the housing 52. A motorized fan 64, having dual fan blades 64a, 64b, is also positioned in the housing 52. An opening 66 is provided in one sidewall 58 for supplying fresh water to the housing 52. Another opening 66a is provided to extract polluted water from the housing 52. Openings 68 are provided in one sidewall 58 for the egress of clean air from the housing 52. The terminal tube 61c has openings in the bottom for reasons explained below. Polluted air is supplied to the housing 52 by means of an air suction device, generally indicated at 70. The device 70 comprises a hollow tube 72 mounted on a wheeled platform 74. A fan and duct member 76 is mounted adjacent the lower end of the tube 72 to draw polluted air through the tube 72 via member 78. A sidearm member T provides means for connecting the air suction device 70 with the tubes 61a, 61b, 61c. Tube 72 is telescopically constructed to allow adjustment of the height of member 78.

In use, the housing 52 is supplied with water via opening 66. Polluted air is drawn through member 78 and is supplied to the tubes 61a, 61b, 61c. The polluted air exits the conduit of tubes 61a, 61b, 61c via the openings in the terminal tube 61c. Fan 64 provides turbulent action to separate the pollutants from the air. Clean air exits the housing 52 through outlets 68. Pollutant-laden water may be extracted from the housing 52 through opening 66a.

It is to be understood that the present invention is not limited to the embodiments described above, but encompasses any and all embodiments within the scope of the following claims.

I claim:

1. A system to remove contaminants from an air stream, comprising:
    a housing having an opening for supplying water thereto and at least one exit opening in the housing, the at least one exit opening including a clean air exit for clean air to exit the housing after removal of contaminants from the air;
    a duct connected to the housing for supplying polluted air thereto;
    means for turbulently mixing the polluted air and water in the housing, thereby separating the air from the contaminants in the polluted air and producing clean air while retaining the contaminants in the water, the means for turbulently mixing the polluted air and water having a pair of cyclonic mixers disposed in said housing,
    a duct system provided to supply water to each said cyclonic mixer and to direct contaminants and water therefrom; and
    a medium provided in the housing for absorbing and separating the contaminants from the water, wherein said medium is selected from the group consisting of clay and sand.

2. A system to remove contaminants from an air stream, comprising:
    a housing having an opening for supplying water thereto and at least one exit opening in the housing, the at least one exit opening including a clean air exit for clean air to exit the housing after removal of contaminants from the air;
    a duct connected to the housing for supplying polluted air thereto;
    means for turbulently mixing the polluted air and water in the housing, thereby separating the air from the contaminants in the polluted air and producing clean air while retaining the contaminants in the water, the means for turbulently mixing the polluted air and water includes a rotating shaft having a plurality of helical blades attached thereto;
    a contaminant-absorbing medium supplied through the opening with the water;
    a grinding blade attached to said rotating shaft for pulverizing the contaminant-absorbing medium, the grinding blade being positioned adjacent the contaminant exit, the contaminant exit directing the contaminant-absorbing medium and water out of the housing; and
    a movable belt encircling the housing, the movable belt having a plurality of receptacles mounted thereon for collecting a portion of the contaminant-absorbing medium and water exiting the housing for recycling back into the housing.

3. The system to remove contaminants from an air stream according to claim 2, wherein said contaminant-absorbing medium is clay.

4. The system to remove contaminants from an air stream according to claim 2, wherein said contaminant absorbing medium is sand.

* * * * *